United States Patent
Duis et al.

(10) Patent No.: US 10,488,598 B2
(45) Date of Patent: Nov. 26, 2019

(54) FERRULE ASSEMBLY WITH BEAM EXPANSION SECTION AND SACRIFICIAL OPTICAL FIBER

(71) Applicants: CommScope Technologies LLC, Hickory, NC (US); CommScope Asia Holdings B.V., DG Bussum (NL)

(72) Inventors: Jeroen Antonius Maria Duis, MN Didam (NL); Sander Johannes Floris, EC Lennisheuvel (NL); Michael Aaron Kadar-Kallen, Harrisburg, PA (US); Dwight Andrew Bretz, Hummelstown, PA (US); Rutger Wilhelmus Smink, Hamont-Achel (BE)

(73) Assignees: CommScope Technologies LLC, Hickory, NC (US); CommScope Asia Holdings B.V. (NL)

( * ) Notice: Subject to any disclaimer, the term of this patent is extended or adjusted under 35 U.S.C. 154(b) by 0 days.

(21) Appl. No.: 15/753,864

(22) PCT Filed: Aug. 18, 2016

(86) PCT No.: PCT/US2016/047651
§ 371 (c)(1),
(2) Date: Feb. 20, 2018

(87) PCT Pub. No.: WO2017/031376
PCT Pub. Date: Feb. 23, 2017

(65) Prior Publication Data
US 2018/0246281 A1 Aug. 30, 2018

Related U.S. Application Data

(60) Provisional application No. 62/207,726, filed on Aug. 20, 2015.

(51) Int. Cl.
*G02B 6/25* (2006.01)
*G02B 6/32* (2006.01)
(Continued)

(52) U.S. Cl.
CPC ......... G02B 6/3818 (2013.01); G02B 6/2551 (2013.01); G02B 6/2552 (2013.01);
(Continued)

(58) Field of Classification Search
CPC .. G02B 6/3818; G02B 6/2552; G02B 6/3846; G02B 6/3853; G02B 6/3863
(Continued)

(56) References Cited

U.S. PATENT DOCUMENTS 5,212,745 A * 5/1993 Miller .................... G02B 6/241
385/25
5,459,805 A * 10/1995 Foster ..................... G02B 6/32
385/33
(Continued)

FOREIGN PATENT DOCUMENTS

JP 2005-115097 A 4/2005
WO 2004053547 6/2004
(Continued)

OTHER PUBLICATIONS

International Search Report and Written Opinion of the International Searching Authority for corresponding International Patent Application No. PCT/US2016/047651 dated Oct. 31, 2016, 11 pages.
(Continued)

Primary Examiner — Akm E Ullah
(74) Attorney, Agent, or Firm — Merchant & Gould P.C.

(57) ABSTRACT

The present disclosure relates to a fiber optic component including a ferrule having a distal end and a proximal end. The ferrule defines a fiber passage extending though the
(Continued)

ferrule along a fiber passage axis in a proximal-to-distal orientation. The fiber optic component also includes an optical fiber structure affixed within the fiber passage. The optical fiber structure includes a beam expansion section optically coupled to a sacrificial section. The beam expansion section has a construction adapted to expand an optical beam from a first beam diameter to an enlarged second beam diameter. The sacrificial section is configured to receive the optical beam having the second beam diameter from the beam expansion section. The sacrificial section is positioned at the distal end of the ferrule and has a polished end face at the distal end of the ferrule. The sacrificial section has a core-less construction or has a core with a core diameter that is larger than the enlarged second beam diameter.

31 Claims, 13 Drawing Sheets

(51) Int. Cl.
  *G02B 6/38* (2006.01)
  *G02B 6/255* (2006.01)
(52) U.S. Cl.
  CPC ............. *G02B 6/32* (2013.01); *G02B 6/3846* (2013.01); *G02B 6/3853* (2013.01); *G02B 6/3863* (2013.01)
(58) Field of Classification Search
  USPC .......................................................... 385/79
  See application file for complete search history.

(56) References Cited

U.S. PATENT DOCUMENTS

| | | | | |
|---|---|---|---|---|
| 5,608,833 | A * | 3/1997 | Au ........................... | G02B 6/04 |
| | | | | 348/E5.141 |
| 5,680,237 | A | 10/1997 | Cheng | |
| 5,996,375 | A * | 12/1999 | Nakai .................. | G02B 6/02138 |
| | | | | 430/290 |
| 6,012,852 | A * | 1/2000 | Kadar-Kallen .......... | G02B 6/32 |
| | | | | 385/74 |
| 6,014,483 | A | 1/2000 | Thual et al. | |
| 6,079,880 | A * | 6/2000 | Blom ...................... | G02B 6/421 |
| | | | | 385/139 |
| 6,142,676 | A * | 11/2000 | Lu ......................... | G02B 6/3807 |
| | | | | 385/139 |
| 6,445,939 | B1 * | 9/2002 | Swanson .............. | A61B 5/0066 |
| | | | | 385/33 |
| 6,606,913 | B1 * | 8/2003 | Gianchandani .......... | G01B 7/22 |
| | | | | 73/777 |
| 6,839,483 | B2 | 1/2005 | Reed et al. | |
| 7,031,567 | B2 | 4/2006 | Grinderslev et al. | |
| 7,155,096 | B2 | 12/2006 | Chanclou et al. | |
| 7,835,603 | B2 | 11/2010 | De Barros et al. | |
| 8,508,843 | B2 * | 8/2013 | Munson .............. | H01S 3/06716 |
| | | | | 359/337 |
| 9,160,450 | B2 * | 10/2015 | Duis ...................... | H04B 10/14 |
| 2003/0087460 | A1 * | 5/2003 | Frateschi ................ | H01S 5/305 |
| | | | | 438/21 |
| 2004/0136664 | A1 * | 7/2004 | Kadar-Kallen .......... | G02B 6/30 |
| | | | | 385/94 |
| 2004/0175073 | A1 | 9/2004 | Grinderslev et al. | |
| 2005/0069327 | A1 * | 3/2005 | Franck ............... | H04B 10/2503 |
| | | | | 398/141 |
| 2005/0220401 | A1 | 10/2005 | Jiang et al. | |
| 2007/0031095 | A1 * | 2/2007 | Fujita ................... | G02B 6/2551 |
| | | | | 385/124 |
| 2007/0165982 | A1 | 7/2007 | Kokkelink et al. | |
| 2008/0013891 | A1 * | 1/2008 | Nishioka .............. | G02B 6/3809 |
| | | | | 385/59 |
| 2011/0229077 | A1 | 9/2011 | Fortusini et al. | |
| 2012/0014645 | A1 * | 1/2012 | Kadar-Kallen .......... | G02B 6/32 |
| | | | | 385/33 |
| 2013/0272658 | A1 | 10/2013 | Floris et al. | |
| 2014/0064665 | A1 | 3/2014 | Ott et al. | |
| 2016/0054523 | A1 * | 2/2016 | Lu .......................... | G02B 6/245 |
| | | | | 264/1.25 |
| 2016/0161678 | A1 * | 6/2016 | Lu ........................ | G02B 6/3846 |
| | | | | 385/79 |
| 2018/0246281 | A1 * | 8/2018 | Duis ....................... | G02B 6/32 |

FOREIGN PATENT DOCUMENTS

| | | |
|---|---|---|
| WO | 2015/013262 A1 | 1/2015 |
| WO | 2015/013264 A1 | 1/2015 |

OTHER PUBLICATIONS

Chanclou, P. et al., "Design and Performance of Expanded Mode Fiber Using Microoptics", Journal of Lightwave Technology, 20(5): 836-842 (2002).

"Fiber Optics: Fiber Basics", Photonics Technical Note #21, Newport Experience Solutions, publicly available prior to the filing of the U.S. Provisional Application filed on Aug. 20, 2015.

EP Search Report dated Mar. 25, 2019; Application No. 16837876.8-1003; 10 pages.

Chanclou et al.; Expand Single-Mode Fiber Using Graded Index Multimode Fiber; 9 page; dated Dec. 5, 2003.

* cited by examiner

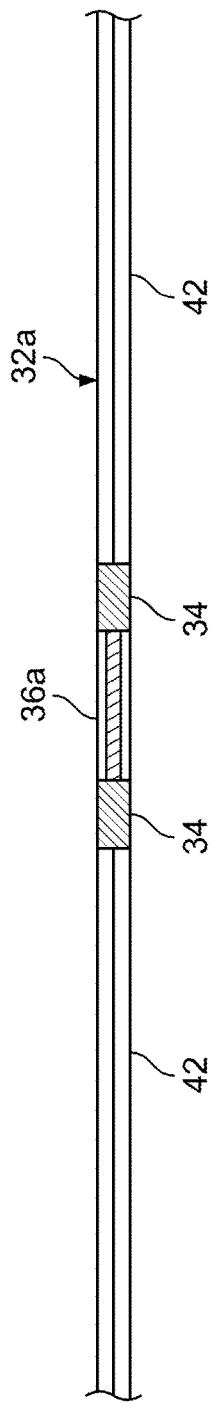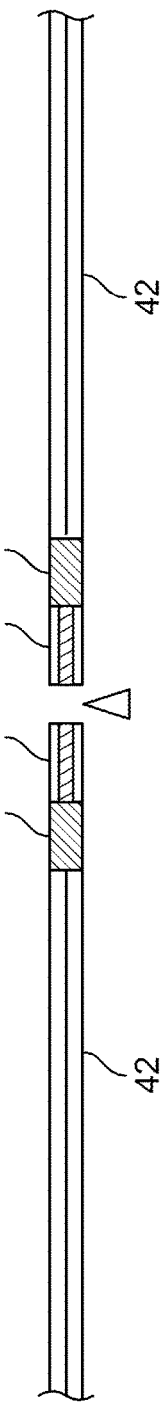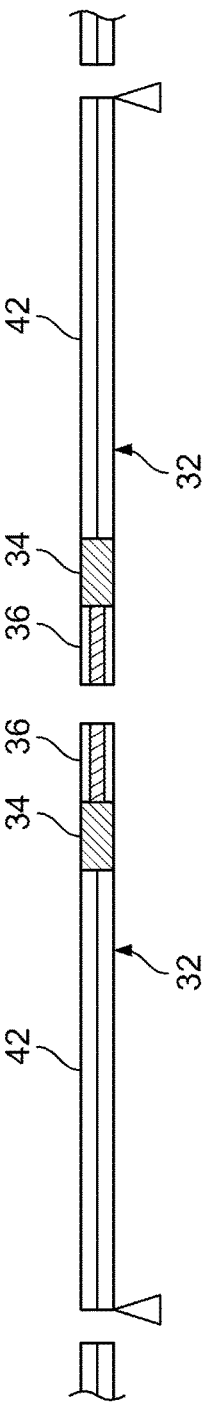

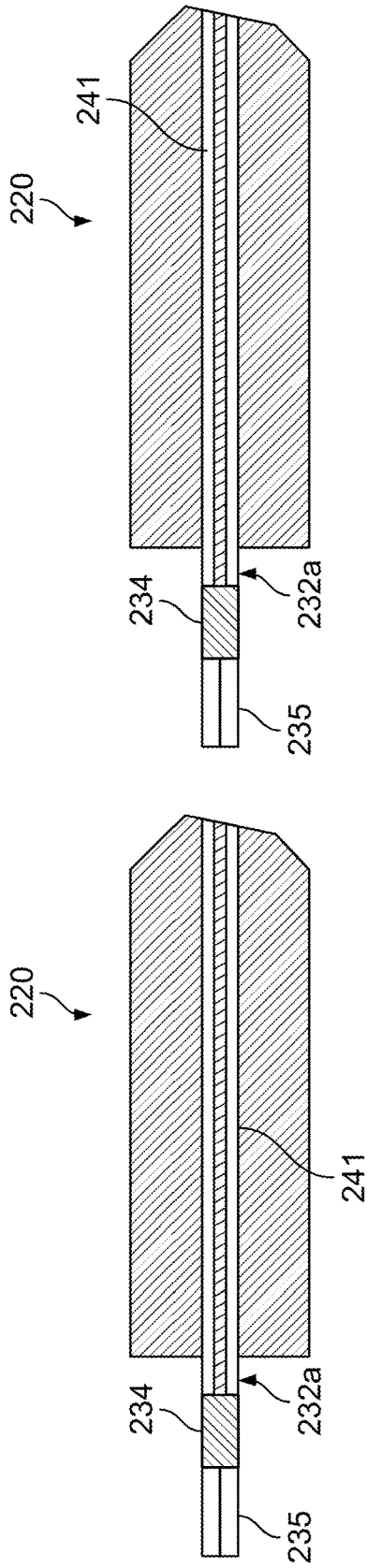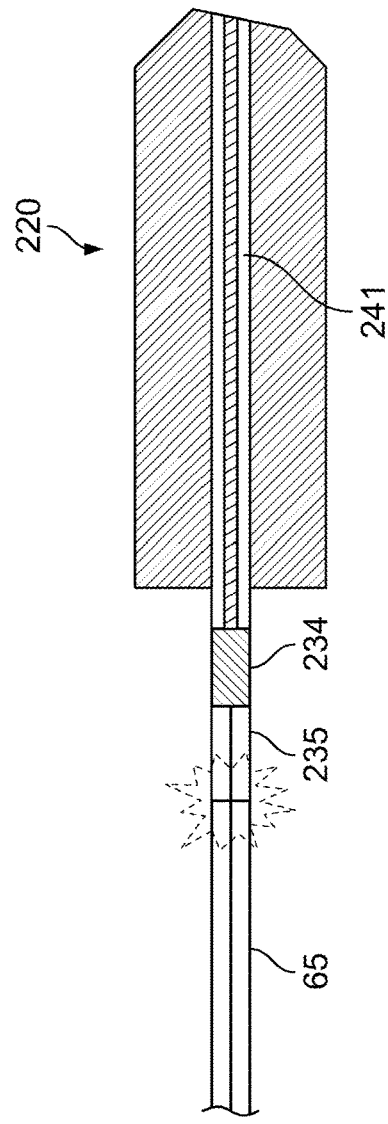
FIG. 26
FIG. 27

FERRULE ASSEMBLY WITH BEAM EXPANSION SECTION AND SACRIFICIAL OPTICAL FIBER

CROSS-REFERENCE TO RELATED APPLICATION

This application is a U.S. National Stage Application of PCT/US2016/047651, filed on Aug. 18, 2016, which claims the benefit of U.S. Patent Application Ser. No. 62/207,726, filed on Aug. 20, 2015, the disclosures of which are incorporated herein by reference in their entireties. To the extent appropriate, a claim of priority is made to each of the above disclosed applications.

TECHNICAL FIELD

The present disclosure relates generally to optical fiber communication systems. More particularly, the present disclosure relates to fiber optic connectors, fiber optic connector and cable assemblies and methods for manufacturing.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected and disconnected.

A typical fiber optic connector includes a ferrule assembly supported at a front end of a connector housing. The ferrule assembly includes a ferrule and a hub mounted to a rear end of the ferrule. A spring is used to bias the ferrule assembly in a forward direction relative to the connector housing. The ferrule functions to support an end portion of at least one optical fiber (in the case of a multi-fiber ferrule, the ends of multiple fibers are supported). The ferrule has a front end face at which a polished end of the optical fiber is located. When two fiber optic connectors are interconnected, the front end faces of their respective ferrules abut one another and the ferrules are forced together by the spring loads of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of a fiber optic adapter that receives the connectors, aligns the ferrules and mechanically holds the connectors in a connected orientation relative to one another.

Connectors are typically installed on fiber optic cables in the factory through a direct termination process. In a direct termination process, the connector is installed on the fiber optic cable by securing an end portion of an optical fiber of the fiber optic cable within a ferrule of the connector. After the end portion of the optical fiber has been secured within the ferrule, the end face of the ferrule and the end face of the optical fiber are polished and otherwise processed to provide an acceptable optical interface at the end of the optical fiber.

Connectors can also be installed on fiber optic cables using an optical splice. The optical splice can be mechanical splice or a fusion splice. Mechanical splices are often used for field terminated connectors. Fusion splices can be used to fusion splice the optical fiber of the fiber optic cable to the rear end of an optical fiber stub secured within a ferrule. United States Patent Application Publication No. US 2014/0064665 A1 discloses example splice-on connector configurations.

It is desirable for the optical fibers of two mating fiber optic connectors to make physical contact (e.g., glass-to-glass) when an optical connection is made between the mating connectors. With the optical fibers of the fiber optic connectors in physical contact with one another, the optical path behaves as though the glass fiber is continuous. In contrast, an air gap between the optical fibers of the mated connectors will result in an increase in loss due to Fresnel reflections at the air/glass interfaces. In addition, the reflected light will cause a reduction in return loss. This change in return loss is present for angled polished connectors (APC), but is particularly problematic for fiber optic connectors having ferrule end faces that are perpendicular to the optical axes of the optical fibers. These effects can be minimized by applying anti-reflection coatings to the end faces of the optical fibers, but this is often inconvenient. Alternatively, an index matching material such as a gel or oil can be placed between the optical fibers of the mated connectors. This is often undesirable, due to perceived shortcomings of index matching materials, including degradation of the materials over time and/or at high optical power, and the attraction of dust.

Fiber optic connectors have been developed for reducing signal loss at a connector-to-connector interface by expanding the beam diameter of the optical signal that propagates between the mated connectors. U.S. Pat. Nos. 7,031,567; 7,155,096; and PCT International Publication No. WO 2015/013262 disclose fiber optic connectors in which a graded index (GRIN) optical fiber is used as a lens to provide an expanded beam connection at a connector-to-connector interface. Expanded beam connectors also can reduce sensitivity to dust and can be used in high power applications to reduce the intensity of light at the mating connector interface.

The amount of expansion provided by a GRIN lens is highly dependent upon the length of the GRIN lens. Thus, the length of the GRIN lens should be precisely controlled. This can be problematic in situations where a GRIN lens is provided at the end face of a ferrule of a fiber optic connector because polishing of the end face will alter the length of the GRIN lens thereby changing the collimating or focusing properties provided by the GRIN lens. This issue can be overcome by providing an air gap between the GRIN lens and the end face of the ferrule. However, as discussed above, air gaps can cause loss due to Fresnel reflections at the air/glass interfaces. Improvements are needed in this area.

SUMMARY

Teachings of the present disclosure relate to methods and structures for increasing the fiber mode field diameter at the demateable interface between two fiber optic connectors so as to reduce signal loss at the interface while maintaining physical contact at the interface.

One aspect of the present disclosure relates to the use of a short sacrificial length of optical fiber at the distal end of a ferrule of an expanded beam connector. In certain examples, the expanded beam connector can include a beam expansion section (e.g., a GRIN optical fiber) for expanding the optical beam diameter of an optical signal that passes through the beam expansion section. In certain examples, the sacrificial optical fiber can be either a core-less optical fiber (e.g., a cylinder of glass) or a step-index optical fiber which has a core diameter that is larger than the beam diameter of the expanded beam provided to the sacrificial fiber. The use of the sacrificial length of optical fiber at the distal end of the expanded beam connector allows two mating connectors to make physical contact (e.g., glass-to-glass). Additionally, during polishing, portions of the sacrificial fiber can be removed without changing the expansion characteristics of the beam expansion section of the fiber optic connector (e.g., the GRIN fiber). It will be appreciated that the sacrificial fibers can have a construction designed so that light passing through the sacrificial fibers excites a plurality of modes. To minimize insertion loss, it is desirable for the sacrificial fiber to be relatively short in length.

Another aspect of the present disclosure relates to the use of a sacrificial length of glass fiber (or other type of sacrificial section, layer, or volume having a composition including glass or other materials) at the distal end of an expanded beam connector to facilitate polishing while still providing a physical contact connector. A portion of this sacrificial fiber can be removed during polishing, leaving the length of an expansion section (e.g., a GRIN lens) unchanged by the polishing process. The sacrificial fiber enables a physical contact expanded beam connector to be created, while relaxing requirements on the polishing process.

In certain examples, a sacrificial section (e.g., a length of sacrificial fiber, a sacrificial layer, etc.) can be utilized with expanded beam connectors using beam expansion structures such as a GRIN lens, a thermally expanded fiber or other means of expanding the beam that do not require a refractive lens surface to achieve focusing. In other examples, a sacrificial section can be utilized with other types of connectors that may or may not include expanded beam connectors.

In certain examples of the present disclosure, the sacrificial section is relatively short in length to avoid unacceptable increases in insertion loss. It will be appreciated that the length of the sacrificial section depends upon a number of factors including the beam waist of the expanded beam, the wavelength of the optical beam traveling through the sacrificial section, the maximum allowable insertion loss attributable to the sacrificial section and the index of refraction of the material forming the sacrificial section.

Another aspect of the present disclosure relates to a fiber optic component including a ferrule having a distal end and a proximal end. The ferrule defines a fiber passage that extends through the ferrule along a fiber passage axis in a proximal-to-distal orientation. The fiber optic component also includes an optical fiber structure affixed within the fiber passage. The optical fiber structure includes a beam expansion section optically coupled to a sacrificial section. The beam expansion section has a construction adapted to expand an optical beam from a first beam diameter to an enlarged second beam diameter. The sacrificial section is configured to receive the optical beam having the second beam diameter from the beam expansion section. The sacrificial section is positioned at the distal end of the ferrule and has a polished end face at the distal end of the ferrule. In certain examples, the sacrificial section has a core-less construction or has a core with a core diameter larger than the second beam diameter.

It will be appreciated that sacrificial sections such as sacrificial fibers in accordance with the principles of the present disclosure can be used with other types of optical fiber structures in addition to beam expanders. For example, sacrificial fibers in accordance with the principles of the present disclosure can be used at the polished end face of a ferrule to fill an air gap between the end face of the ferrule and an optical component within the ferrule while preventing the optical component from being exposed to polishing. This type of arrangement is advantageous for any optical component or structure that will be negatively affected by a polishing process. For example, certain optical fibers may have mechanical or structural properties that are negatively affected by polishing processes. For such applications, the sacrificial fiber can be used to manufacture a physical contact connector without requiring the polish-sensitive component within the ferrule to be exposed to polishing processes. In certain aspects, the sacrificial section may have some light guiding properties where a plurality of modes can be excited (e.g., the sacrificial fiber may be a single mode fiber or a multi-mode fiber). In other aspects, the sacrificial section may have a construction that does not have light guiding properties (e.g., a core-less fiber) so that light propagates through the sacrificial section unguided in a manner comparable to light propagating through free space. For sacrificial sections that do not have light guiding properties, the lengths of the sacrificial sections can be relatively short so as to minimize signal power loss.

Another aspect of the present disclosure relates to a fiber optic component including a ferrule having a distal end and a proximal end. The ferrule defines a ferrule passage extending through the ferrule along a fiber passage axis in a proximal-to-distal orientation. The fiber optic component also includes an optical fiber structure affixed within the fiber passage. The optical fiber structure includes a first section optically coupled to a sacrificial section. The sacrificial section is positioned at the distal end of the ferrule and has a polished end face at the distal end of the ferrule. In certain examples, the sacrificial section has a core-less construction or has a core with a core diameter larger than the second beam diameter. In certain examples, the first section of the optical fiber structure has mechanical characteristics, chemical characteristics, or other characteristics that are not compatible with polishing processes.

A further aspect of the present disclosure relates to a fiber optic component including a ferrule having a distal end and a proximal end. The ferrule defines a fiber passage extending through the ferrule along a fiber passage axis in a proximal-to-distal orientation. The fiber optic component also includes an optical fiber structure affixed within the fiber passage. The optical fiber structure includes a beam expansion section and a proximal end section optically connected to the beam expansion section. The proximal end section forms a stub end of the optical fiber structure. The stub end is proximally offset from the proximal end of the ferrule by a proximal offset distance. The proximal offset distance is less than or equal to 70 millimeters. The proximal end section includes a single mode optical fiber. The single mode optical fiber can include a step-index optical fiber or a bend insensitive optical fiber or other fiber construction having a cutoff wavelength less than or equal to 1310 nanometers.

A further aspect of the present disclosure relates to methods for manufacturing ferrules with optical stubs. In certain examples, beam expansion structures such as GRIN fibers can be initially fusion spliced to another optical fiber to form a pre-manufactured fiber stub. The pre-manufactured fiber stub is then inserted into and affixed within a ferrule to form a ferrule assembly including a ferrule having an optical stub with a free end that projects from a proximal end of the ferrule. The pre-manufacture of the precursor fiber stubs can be readily automated using a reel to feed an automated assembly line.

A variety of additional aspects will be set forth in the description that follows.

The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 11 depicts a first step of a second method for manufacturing the ferrule stub assembly of FIG. 1;

FIG. 12 depicts a second step of the second method for manufacturing the ferrule stub assembly of FIG. 1;

FIG. 13 depicts a third step of the second method for manufacturing the ferrule stub assembly of FIG. 1;

FIG. 26 depicts a fourth step of the fourth method for manufacturing the ferrule stub assembly of FIG. 22, wherein two of the ferrule stub assemblies are produced in this step;

FIG. 27 depicts one of the ferrule stub assemblies produced at the step of FIG. 26 being fusion spliced to the end of an optical fiber of a fiber optic cable;

DETAILED DESCRIPTION

As used herein, the "mode field" of an optical fiber at a predetermined wavelength is the distribution of light which is transmitted by the optical fiber. It will be appreciated that the "mode field" of a given optical fiber may vary depending upon the wavelength of the light signal being transmitted therethrough. As used herein, the "mode field area" is the transverse cross-sectional area of the mode field at a given location of the optical fiber. The "mode field area" is typically circular and defines a mode field diameter across the mode field area. The mode field diameter can be defined as the diameter of the mode field area where the power density is reduced to $1/e^2$ of the maximum power density. The mode field area can also be referred to as a "spot area" or "beam area" and the mode field diameter can also be referred to as the "beam diameter", "spot size" or "beam width." The term "beam waist" refers to the radius of the beam area where the power density is reduced to $1/e^2$ intensity of the maximum power density.

Figure 1:
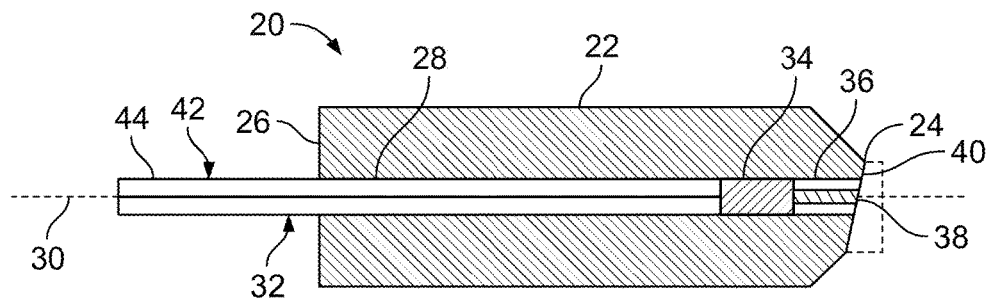
FIG. 1 depicts an expanded beam ferrule stub assembly in accordance with the principles of the present disclosure.

FIG. 1 shows a fiber optic component such as an expanded beam fiber optic ferrule assembly 20 for a physical contact fiber optic connector. Example fiber optic connector configurations in which the expanded beam fiber optic ferrule assembly 20 can be used are disclosed in PCT International Publication No. WO 2015/013262 (PCT Application No. PCT/US2014/047592) which is hereby incorporated by reference in its entirety.

The expanded beam fiber optic ferrule assembly 20 includes a ferrule 22 (i.e., a ferrule body, a ferrule member or like terms) having a distal end 24 and a proximal end 26. The ferrule 22 defines a fiber passage 28 which extends though the ferrule 22 along a fiber passage axis 30 in a proximal-to-distal orientation. The expanded beam fiber optic ferrule assembly 20 further includes an optical fiber structure 32 affixed within the fiber passage 28. The optical fiber structure 32 includes a beam expansion section 34 optically coupled to a sacrificial section 36. The beam expansion section 34 has a construction adapted to expand an optical beam from a first beam diameter D1 to an enlarged second beam diameter D2 (see FIGS. 29 and 30). The sacrificial section 36 is positioned to receive the optical beam having the second beam diameter D2 from the beam expansion section 34. The sacrificial section 36 is positioned at the distal end 24 of the ferrule 20. The sacrificial section 36 has a polished end face 38 that generally coincides with a polished distal end face 40 of the ferrule 20. In certain examples, the sacrificial section 36 has a core-less construction or has a core with a core diameter larger than the second beam diameter D2.

The beam expansion provided by the beam expansion section 34 ensures that an optical beam having a relatively large beam diameter D2 (e.g., 20 to 70 micrometers, or 30 to 70 micrometers, or 40 to 70 micrometers, or greater than 30 micrometers, or greater than 40 micrometers) is injected into the sacrificial section 36. The 20 to 70 micrometer beam diameter can be provided in a GRIN lens having an outer diameter in the range of 120-130 micrometers. The sacrificial section 36 is relatively short in length and is configured such that the optical beam output from the sacrificial section 36 at the polished end face 38 also has a relatively large beam diameter. When two fiber optic connectors including the expanded beam ferrule assemblies 20 are mated at a connector-to-connector interface, the polished end faces 38 of the sacrificial sections 36 of the ferrule assemblies 20 make physical contact with one another. The relatively large beam diameters provided at the polished end faces 38 provide a large area of overlap between the beam spot areas of the contacting sacrificial sections 36 thereby reducing the importance of extremely precise co-axial alignment between the sacrificial sections 36 at the connector to connector interface.

Figure 29:
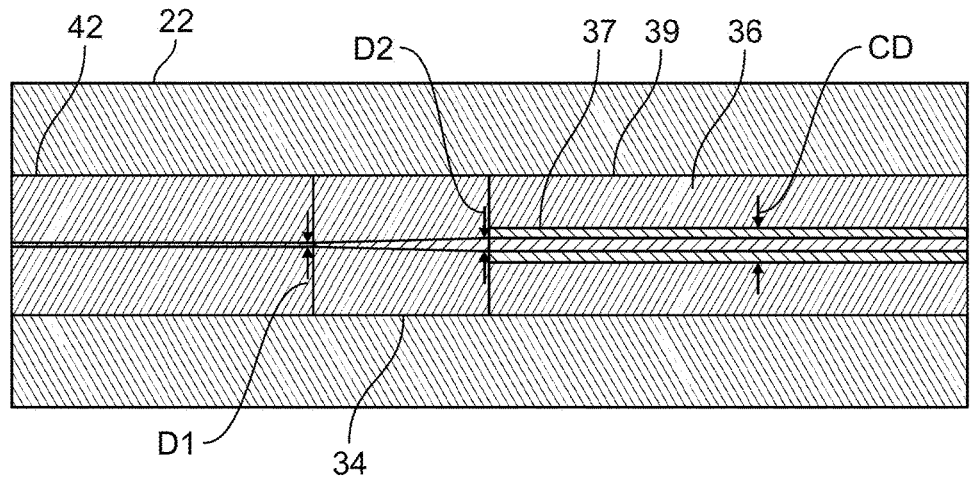
FIG. 29 is an enlarged view of a distal end portion of the ferrule assembly of FIG. 1 prior to polishing of the distal end case of the ferrule.
Figure 30:
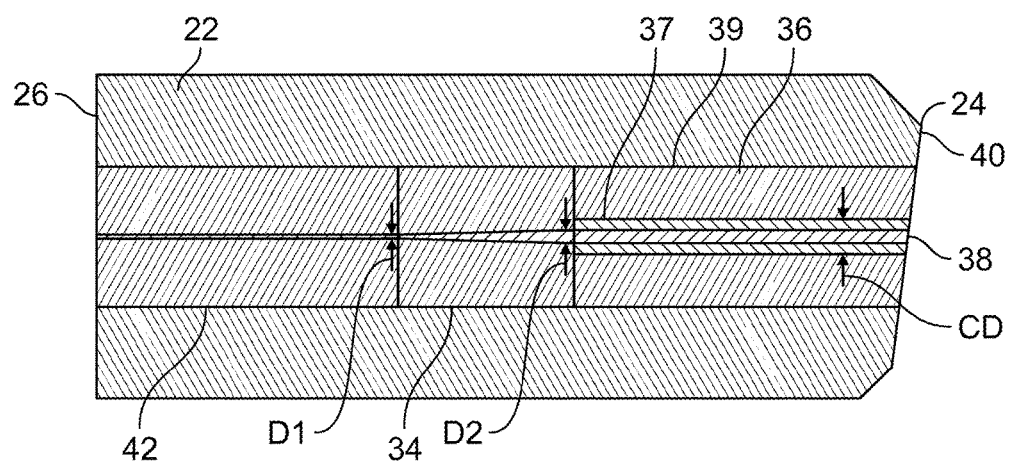
FIG. 30 is an enlarged view of the distal end portion of the ferrule assembly of FIG. 1 after polishing of the distal end face of the ferrule.

The distal end face 40 of the ferule can be straight or angled polished. In a straight polished ferrule, the end face 40 is generally perpendicular to the fiber passage axis 30. In an angle polished ferrule, the end face is often angled 4 or 8 degrees relative to a plane that is perpendicular with respect to the fiber passage axis 30. The sacrificial section 36 protects the beam expansion section 34 during polishing of the ferule end face 40 thereby ensuring the length and the expansion characteristics of the beam expansion section 34 are not altered by the polishing process. Some or all of the sacrificial section 36 can be removed during polishing of the ferrule end face 40 without meaningfully impacting the beam diameter of the optical signal output from the optical fiber structure 32 at the end face 40 of the ferrule 20. FIG. 29 shows the ferrule end face 40 prior to polishing, and FIG. 30 shows the ferrule end face 40 after polishing where a distal end portion of the sacrificial section 36 has been removed (i.e., polished away along with the end of the ferrule) without altering the beam expansion section 34. In FIGS. 29 and 30, the amount of material removed from the ferrule is exaggerated for illustration purposes. The sacrificial section 36 fills the gap between the beam expansion section 34 and the ferrule end face 40 so as to prevent polishing debris or other contaminants from entering the gap. During an optical connection with another ferrule, the sacrificial section 36 allows the optical fiber structure 32 to make physical contact with the optical fiber structure of the other ferrule such that air gaps are not present between the fiber structures of the ferrules.

Referring again to FIG. 1, the optical fiber structure 32 includes a stub optical fiber 42 optically coupled to the beam expansion section 34 such that the beam expansion section 34 is positioned between the stub optical fiber 42 and the sacrificial section 36. In one example, the beam expansion section 34 has one end (the end corresponding to the enlarged beam diameter D2) fusion spliced to the sacrificial section 36 and an opposite end (the end corresponding to the reduced beam diameter D1) fusion spliced to the stub optical fiber 42. The stub optical fiber 42 includes a stub end portion 44 (i.e., a stub portion having a free end) that projects proximally from the proximal end 26 of the ferrule 22. The stub optical fiber 42 can include a step index optical fiber and can be a single mode or multi-mode optical fiber. In certain examples the stub optical fiber 42 can include a glass core surrounded by a glass cladding layer. In certain examples, the stub optical fiber 42 can have a beam diameter D1 that is substantially smaller than the enlarged beam diameter D2. In certain examples, the beam diameter D1 of the stub optical fiber 42 can be in the range of 2-15 micrometers or 8 to 12 micrometers. In certain examples, the stub optical fiber 42 is configured to convey light having a beam diameter that is substantially smaller than the enlarged beam diameter D2. In certain examples, the stub optical fiber 42 is configured to convey light having a beam diameter that is generally equal to the reduced beam diameter D1. In certain examples, the stub optical fiber 42 is a step-index optical fiber having a cutoff wavelength less than or equal to 1310 nanometers. In certain examples, the stub optical fiber 42 projects less than 50 millimeters proximally beyond the proximal end of the ferrule 22. In certain examples, the stub optical fiber 42 is a single mode optical fiber having a cutoff wavelength less than or equal to 1310 nanometers. In certain examples, the single mode optical fiber can be a step-index fiber or a bend insensitive fiber or other fiber construction. In certain examples, the stub optical fiber functions as a single mode optical fiber for wavelengths in the range of 1260 to 1675 nanometers.

Figure 33:
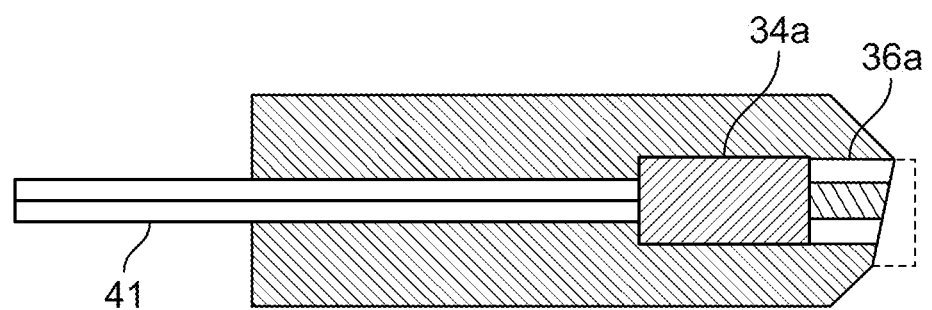
FIG. 33 shows another expanded beam fiber optic ferrule assembly in accordance with the principles of the present disclosure.

For larger beam diameters, an expansion section 34a can be provided having an outer diameter that is larger than a corresponding outer diameter of the of the stub optical fiber 41 (see FIG. 33). In the depicted example, the stub optical fiber 41 can be a single mode optical fiber having an outer diameter in the range of 120-130 micrometers and the expansion section 34a can have an outer diameter that is at least 1.25 or 1.5 times as large as the beam diameter of the stub optical fiber. In another example, the stub optical fiber 41 can be a single mode optical fiber having an outer diameter of at least about 250 micrometers and the expansion section 34a can have an outer diameter that is at least about 2 times as large as the beam diameter of the stub optical fiber. A sacrificial fiber 36a can have an outer diameter that matches the outer diameter of the expansion section 34a. In certain examples, the expansion section 34a can provide an expanded beam diameter larger than 75 micrometers or larger than 100 micrometers.

The beam expansion section 34 of the optical fiber structure 32 can be configured to expand a light beam traveling in a first direction through the beam expansion section fiber segment 34 and to focus a light beam traveling in an opposite second direction through the beam expansion section 34. For example, the beam expansion section 34 expands light traveling though the beam expansion section 34 toward the sacrificial section 36 and focuses light traveling through the beam expansion section 34 toward the stub optical fiber 42. It will be appreciated that the beam expansion section 34 functions to provide a transition in beam diameter between the stub optical fiber 42 and the sacrificial section 36.

In certain examples, the beam expansion section 34 can include a collimator for expanding/focusing light including, for example, a lens or an expanded core of a fiber, in particular, a thermally-expanded core. In certain examples, the beam expansion section 34 can include a lens such as a graded index (GRIN) lens (e.g., a graded index fiber). A GRIN lens may be made with a core having a refractive index that varies generally parabolically as a function of the radius. For example, the GRIN lens can have a generally parabolic fiber refractive index profile that has a maximum value at the center of the core and that gradually decreases as the core extends radially away from the center of the core. The amount of expansion provided by the GRIN lens is dependent upon its construction and length. An example length of a quarter pitch of a GRIN lens is about 0.5-0.8 millimeters depending on the requirements. A GRIN lens typically has a length tolerance of about ±10 micrometers. Further details about the structure of a GRIN lens are disclosed at U.S. Pat. No. 7,031,567, which is hereby incorporated by reference in its entirety.

Typically, maximum expansion in a GRIN lens is achieved at quarter pitch and at each odd-integer multiple of the quarter pitch length. As indicated above, the amount of expansion provided by the GRIN lens is dependent upon its configuration and length. A quarter pitch is one quarter of the length of a full sinusoidal period that a light ray traverses in the lens. In certain examples, the length of the pitch can be calculated by the following formula:

$$l_{pitch} = \frac{x n_{core} D}{NA}$$

wherein n is the core refractive index, D is the physical core diameter, and NA is the numerical aperture. In certain examples, NA is in the range 0.11<NA<0.14. With the NA and the core index of refraction known or selected, the core diameter determines the pitch-length. The core diameter also establishes a beam expansion factor. As indicated above, maximum beam expansion occurs at the quarter pitch length and odd-integer multiples thereof.

The sacrificial section 36 can have a construction that causes the expanded optical beam received from the beam expansion section 34 to pass though the sacrificial section 36. In certain examples, the sacrificial section 36 has a core-less construction such as a core-less optical fiber or a core-less piece/section of glass. In certain examples, the sacrificial section 36 can include a core-less section of material having a composition that may include glass, plastic, other materials, and combinations thereof. In certain examples, the sacrificial section is formed by a core-less fiber having a combination that may include glass, plastic, other materials and combinations thereof. A core-less section can allow the expanded beam to pass through unguided in a manner comparable to the propagation of light in free space. In certain examples, the sacrificial section 36 includes a step index fiber having a core surrounded by a cladding layer, where a diameter of the core is substantially larger than the expanded second beam diameter D2. It will be appreciated that the cladding has a different index of refraction as compared to the index of refraction of the core. In certain examples, the sacrificial section 36 includes a step index fiber having a core surrounded by a cladding layer, where the diameter of the core is at least 1.25 times as large as the expanded second beam diameter D2. In certain examples, the sacrificial section 36 includes a step index fiber having a core surrounded by a cladding layer, where the diameter of the core is at least 1.5 times as large as the expanded second beam diameter D2. In certain examples, the sacrificial section 36 includes a step index fiber having a core surrounded by a cladding layer, where the diameter of the core is at least 2.0 times as large as the expanded second beam diameter D2. FIGS. 29 and 30 show the sacrificial section 36 having a core 37 surrounded by a cladding layer 39. The core 37 is shown having a core diameter CD that is substantially larger than the expanded second beam diameter D2. In certain examples, the sacrificial section 36 is a single mode fiber or a multi-mode fiber having a relatively large core diameter such as a core diameter sized as described above.

Sacrificial section 36 is also relatively short in axial length. The axial length of the sacrificial section 36 is measured in a direction along the axis of the optical fiber structure 32. In certain examples, the second beam diameter equals 30 micrometers or less, and the sacrificial section 36 has a length less than or equal to 275 micrometers. In certain examples, the second beam diameter is in the range of 30-50 micrometers, and the sacrificial section 36 has a length less than or equal to 760 micrometers. In certain examples, the second beam diameter is in the range of 50-100 micrometers, and the sacrificial section 36 has a length less than or equal to 3040 micrometers. In certain examples the sacrificial section 36 is shorter in axial length than the stub axial fiber 42. In certain examples, the sacrificial section 36 has a length less than or equal to 3 millimeters, or less than or equal to 2 millimeters, or less than or equal to 1 millimeter, or less than or equal to 0.5 millimeters, or less than or equal to 0.3 millimeters. In certain examples, the axial length of the sacrificial section 36 is less than one half of the axial length of the ferrule after polishing. In certain examples, the axial length of the sacrificial section 36 is less than one third of the axial length of the ferrule after polishing. In certain examples, the axial length of the sacrificial section 36 is less than one quarter of the axial length of the ferrule after polishing.

It will be appreciated that the desired axial length of the sacrificial section 36 is dependent upon a number of factors that include acceptable insertion loss, the wavelength of the light beam intended to pass through the sacrificial section 36, the index of refraction of the sacrificial section 36 and the size of the expanded second beam diameter D2. This relationship can be defined by the following formula:

$$s = \frac{2n\pi w_0^2}{\lambda} \sqrt{10^{\frac{IL(dB)}{10}} - 1}$$

Figure 28:
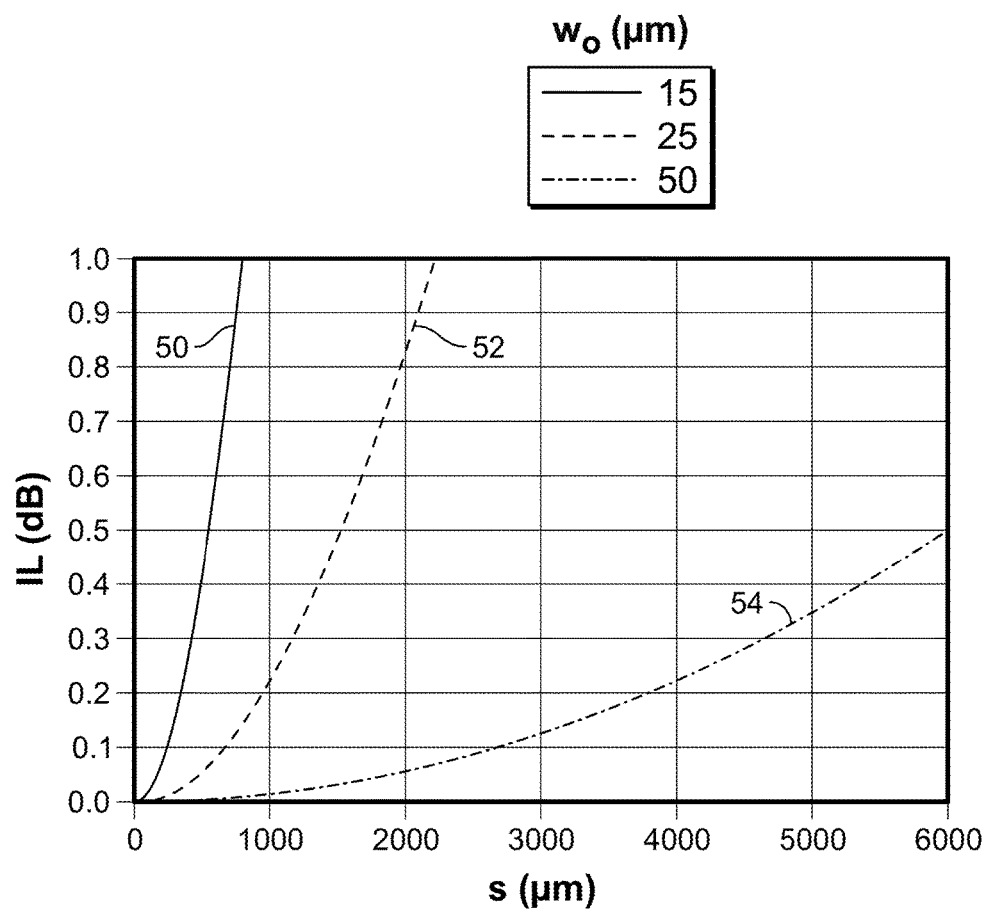
FIG. 28 is a graph illustrating the relationship between insertion loss and length in a sacrificial section in accordance with the principles of the present disclosure.

In the above formula, s equals the length of sacrificial fiber between two GRIN lenses in a mated connector pair. Also, n is the index of refraction of the sacrificial section. Additionally, IL is a maximum acceptable insertion loss in dB generated by the optical beam traveling through the length s of sacrificial fiber. Further, $w_o$ is the beam waist of the optical beam in micrometers at the second beam diameter D2, and $\lambda$ is the wavelength of the optical beam in micrometers. The length of the sacrificial section 36 of a single one of the ferrule assemblies equals s/2. FIG. 28 is a graph generated from the above equation showing s on the x-axis and IL on the y-axis. In generating the graph, a value of 1.45 was used of n and a value of 1.31 was used for λ. Plot 50 corresponds to a beam having a beam waist $w_o$ of 15 micrometers. Plot 52 corresponds to a beam having a beam waist $w_o$ of 25 micrometers. Plot 54 corresponds to a beam having a beam waist $w_o$ of 50 micrometers. In one example, an acceptable insertion loss value is 0.5 dB. In another example, an acceptable insertion loss is 0.2 dB. In still a further example, an acceptable insertion loss is 0.1 dB.

Figure 31:
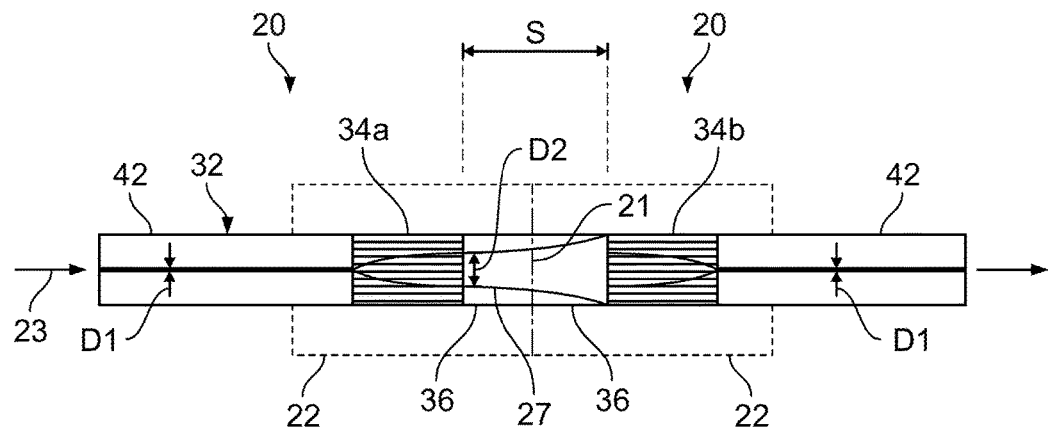
FIG. 31 shows two mated ferrule assemblies where the ferrule assemblies each have a GRIN sized at one quarter pitch.

FIG. 31 shows two optically connected ferrule assemblies 20 (depicted having straight polished end faces) where the end faces 40 of the ferrules 22 are in contact with one another and the optical fiber structures 32 are co-axially aligned. The end faces 40 of the ferrules 22 meet at a connection interface 21. As shown at FIG. 31, the beam expansion sections 34 are separated from one another by the distance which equals the combined axial length of the sacrificial sections 36. Light is shown traveling in a direction 23 through the ferrule assemblies. The beam expansion sections 34 can each include a GRIN lens having an axial length selected at one quarter pitch so as to provide maximum expansion. An optical beam 27 is shown slightly expanding (the expansion is exaggerated in FIG. 31 for illustration purposes) as the beam 27 passes in the direction 23 through the sacrificial sections 36 between the beam expansion sections 34. The difference in the spot size of the beam between exiting the first expansion section 34a and entering the second expansion section 34b represents loss since the outer periphery of the larger spot size will not be able to be focused by the second expansion section 34b back into core of the corresponding stub optical fiber 42. The distance s for the above insertion loss formula is the distance between the minimum beam waists in the region between the beam expansion sections 34. In this case, the minimum beam waist of an expanded beam exiting the left expansion section 34 is located at the exit face of the left expansion section 34 and the minimum beam waist of an expanded beam exiting the right expansion section 34 is at the exit face of right expansion portion. Thus, for the example of FIG. 31, the distance s for the above insertion loss formula equals the spacing between the two expansion sections.

Figure 32:
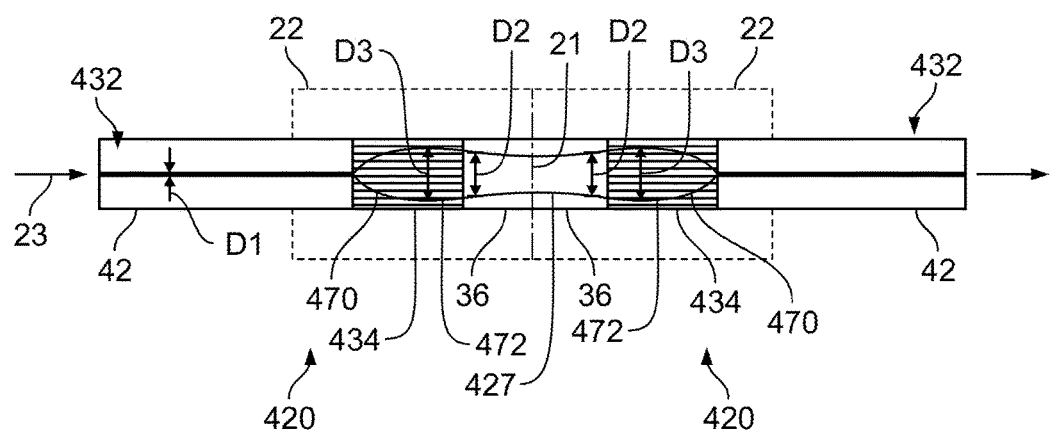
FIG. 32 shows two mated ferrule assemblies where the ferrule assemblies each have a GRIN sized at a size slightly larger in axial length than one quarter pitch.

FIG. 32 shows two optically connected ferrule assemblies 420 (depicted having straight polished end faces) where the end faces 40 of the ferrules 22 are in contact with one another and the optical fiber structures 432 are co-axially aligned. The end faces 40 of the ferrules 22 meet at a connection interface 21. As shown at FIG. 32, beam expansion sections 434 are separated from one another by a distance which equals the combined length of the sacrificial sections 36. Light is shown traveling in a direction 23 through the ferrule assemblies. The beam expansion sections 434 can each include a GRIN lens having an axial length selected at slightly axially longer than one quarter pitch so as to provide maximum expansion and also slight focusing. The beam expansion sections 434 are configured to have a first portion that expands the optical beam 427 and a second portion that focuses the optical beam 427. As the light travels in the direction 23 through the first expansion section 434a, the beam 427 is expanded from beam diameter D1 to a maximum beam diameter D3 by a major portion 470 of the beam expansion section 434a. Then a minor portion 472 of the beam expansion section 434a slightly focuses the beam 427 from the maximum diameter D3 to the diameter D2 as the beam exits the beam expansion section 434a and enters the sacrificial section 36. In the sacrificial sections 36, the beam 427 gradually expands out from the focused angle provided to the sacrificial section 36 by the minor portion 472 of the beam expansion section 434a (the expansion is exaggerated in FIG. 32 for illustration purposes). As shown at FIG. 32, the beam 427 has a symmetrical "waisted" configuration relative to a midpoint between the first and second expansion sections 434a, 434b with a minimum spot size at the midpoint between the first and second expansion sections 434a, 434b. The midpoint location coincides with the connection interface 21. Expansion of the beam 427 within the sacrificial sections 36 allows the beam diameter D2 defined by the beam 427 when the beam enters the sacrificial sections 36 to be equal to the beam diameter D2 defined by the beam 427 when the beam 427 exits the sacrificial sections 36. Upon entering the second beam expansion section 434b, the beam 427 is expanded back to the diameter D3 by the minor portion 472 and then focused back to the diameter D1 by the major portion 470 before passing into the stub fiber section 42.

In calculating loss insertion loss for the example of FIG. 32 using the above loss formula, s once again equals the distance between the two minimum beam waists of the two expansion sections 434. However, in this case, both of the minimum beam waists are positioned at the connection interface 21. Thus, "s" equals zero and no meaningful loss is generated.

The ferrule 22 can be constructed of a relatively hard material capable of protecting and supporting the optical fiber structure 32. In certain examples, the optical fiber structure 32 is secured or affixed (e.g., adhesively bonded by a material such as epoxy) within the fiber passage 28 of the ferrule 22. In certain examples, at least portions of the optical fiber structure within the ferrule 22 are stripped so as to include bare glass bonded within the ferrule. In one example, the ferrule 22 has a ceramic construction. In other examples, the ferrule 22 can be made of alternative material such as Ultem, thermoplastic material such as polyphenylene, sulfide (PPS), or other engineering plastics or metals. In certain examples, the ferrule 22 can have a longitudinal length in the range of 5-15 millimeters.

Figure 2:
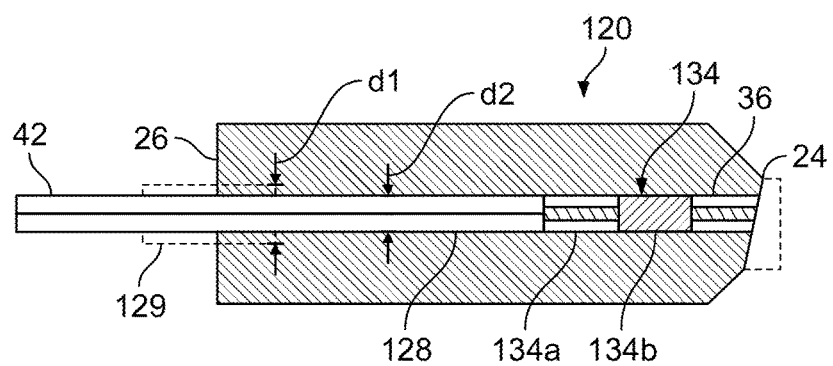
FIG. 2 depicts another expanded beam ferrule stub assembly in accordance with the principles of the present disclosure.
Figure 3:
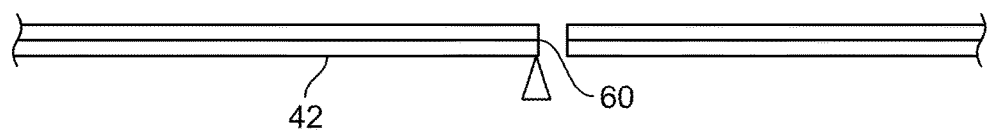
FIG. 3 depicts a first step of a first method for manufacturing the ferrule stub assembly of FIG. 1.
Figure 4:
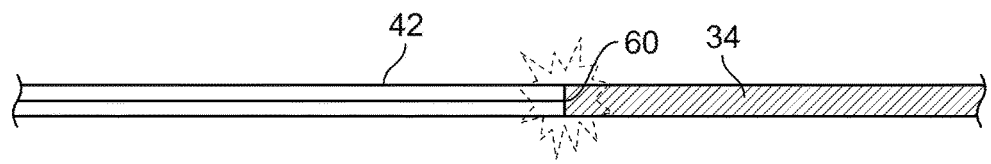
FIG. 4 depicts a second step of the first method for manufacturing the ferrule stub assembly of FIG. 1.
Figure 5:
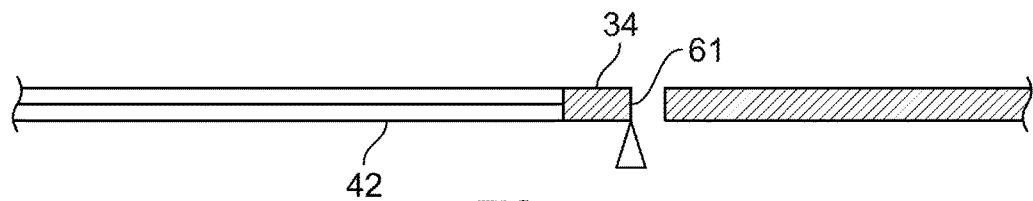
FIG. 5 depicts a third step of the first method for manufacturing the ferrule stub assembly of FIG. 1.
Figure 6:
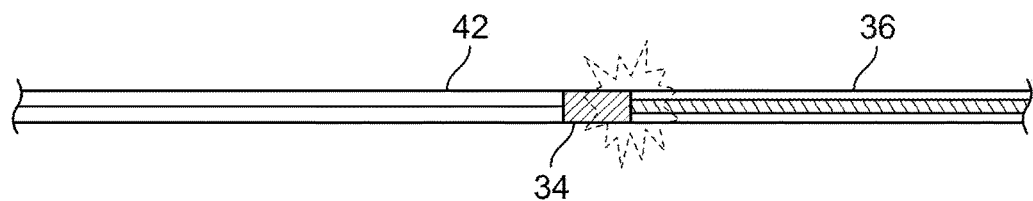
FIG. 6 depicts a fourth step of the first method for manufacturing the ferrule stub assembly of FIG. 1.
Figure 7:
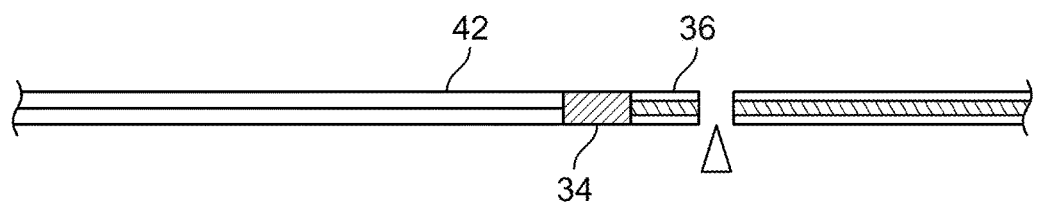
FIG. 7 depicts a fifth step of the first method for manufacturing the ferrule stub assembly of FIG. 1.
Figure 8:
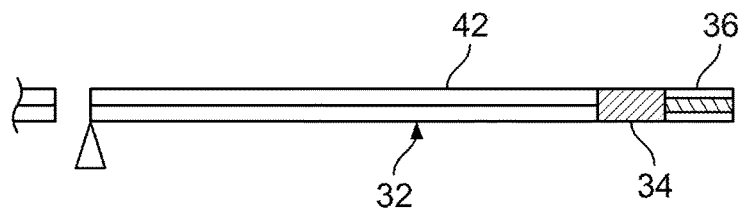
FIG. 8 depicts a sixth step of the first method for manufacturing the ferrule stub assembly of FIG. 1.

FIG. 2 depicts another expanded beam fiber optic ferrule assembly 120 in accordance with the principles of the present disclosure. Similar to the ferrule assembly 20, the ferrule assembly includes an optical fiber structure including the sacrificial section 36 and the stub optical fiber 42. However, the ferrule assembly 120 has a modified beam expansion section 134 that includes a plurality of optical components that are fused together and that cooperate to provide beam expansion. In the depicted example, the beam expansions section 134 includes a first expansion portion 134a and a second expansion portion 134b. In one example, the first expansion portion 134a includes a pre-expansion structure such as a core-less fiber or a multi-mode optical fiber having a larger core diameter than the stub optical fiber, and the second expansion portion 134b includes a GRIN lens. Also, the ferrule assembly 120 can include a modified ferrule 122 including a fiber passage 128 with a stepped diameter. For example, the fiber passage 128 can have a first diameter d1 that is larger than a second diameter d2. The first diameter d1 can be positioned at the proximal end of the ferrule 122 and the second diameter d2 can be positioned adjacent the distal end of the ferrule 122. In certain examples, the portion of the optical fiber stub within the section of the fiber passage 128 having the first diameter d1 can be protected by a protective coating 129 (e.g., acrylate or other polymeric material) and the portion of the optical fiber stub within the section of the fiber passage 128 having the second diameter d2 can include bare glass (i.e., a glass core and cladding or a core-less fiber that is not surrounded by a protective coating).

Figure 22:
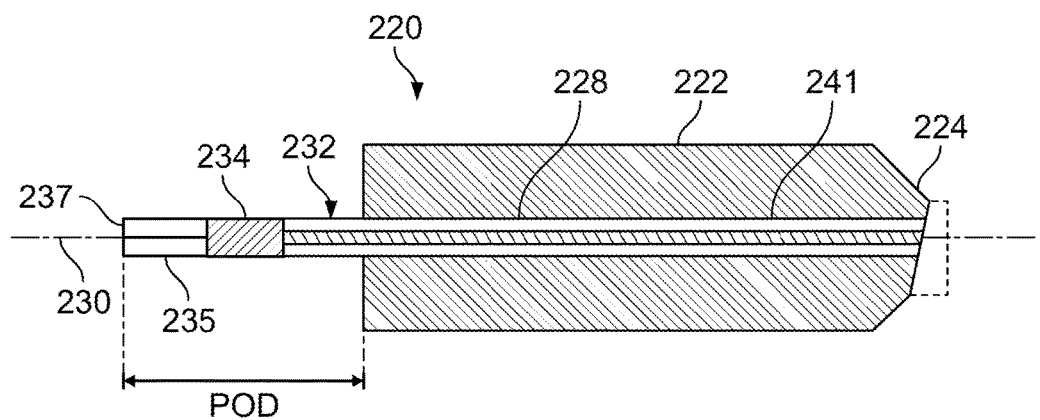
FIG. 22 depicts a further expanded beam ferrule assembly in accordance with the principles of the present disclosure.

FIG. 22 depicts another expanded beam ferrule assembly 220 in accordance with the principles of the present disclosure. The expanded beam ferrule assembly 220 includes a ferrule 222 having a distal end 224 and a proximal end 226. The ferrule 222 defines a fiber passage 228 extending though the ferrule 222 along a fiber passage axis 230 in a proximal-to-distal orientation. The ferrule assembly 220 also includes an optical fiber structure 232 affixed within the fiber passage 228. The optical fiber structure 232 includes a beam expansion section 234 that can have the construction of any of the types described above. The optical fiber structure 232 also includes a proximal end section 235 optically connected with the beam expansion section 234. The proximal end section 235 forms a stub end 237 of the optical fiber structure 232. The stub end 237 is proximally offset from the proximal end 226 of the ferrule 222 by a proximal offset distance POD. The proximal offset distance POD is less than or equal to 70 millimeters. The proximal end section 235 can include a step-index optical fiber or a bend insensitive optical fiber. In certain examples, the proximal end section can include single mode optical fiber having a cutoff wavelength less than or equal to 1310 nanometers. In certain examples, the proximal end section 235 includes a single mode optical fiber having a cutoff wavelength less than or equal to 1310 nanometers. The optical fiber structure 232 can also include a distal fiber section 241 affixed in the fiber passage 228 of the ferrule 222. The distal fiber section 241 can have a larger core diameter than the optical fiber forming the proximal end section 235. In one example, the core diameter of the distal fiber section 241 can be at least 1.25, 1.5, 1.75 or 2 times as large as the core diameter of the proximal end section 235.

The beam expansion section can be optically coupled (e.g., fusion spliced) at a location between the proximal end section 235 and the distal fiber section 241. The beam expansion section 234 can be configured to expand an optical beam traveling in a distal direction through the beam expansion section 234 and to focus light traveling in a proximal direction through the beam expansion section 234. The beam expansion section 234 can have a construction of the type described with respect to the beam expansion section 34. In the depicted example, the beam expansion section 234 is positioned proximally with respect to the proximal end 226 of the ferrule 222.

In one example, the distal fiber section 241 has a construction designed and configured to maintain a constant mode field diameter along its length. In one example, the distal fiber section 241 is a step-index optical fiber having a core surrounded by a cladding with a discrete radial step in refractive index between the core and the cladding. In certain examples, the distal fiber section 241 is designed to inhibit the excitation of multiple transmission modes over a predetermined range of wavelengths (e.g., 1260-1675 nanometers). Thus, distal fiber section 241 supports only the single fundamental mode over the predetermined range of wavelengths. In certain examples, the distal fiber section 241 can include a single mode optical fiber having a cutoff wavelength less than or equal to 1310 nanometers. In certain examples, the distal fiber section 241 has a core diameter greater than 10 micrometers, or greater than 12 micrometers, or greater than 20 micrometers, or greater than 30 micrometers, or greater than 40 micrometers, or greater than 50 micrometers. In other examples, the distal fiber section 241 has a core diameter within the range of 50 to 100 micrometers. In other examples, the distal fiber section 241 has a core diameter in the range of 20 to 125 micrometers. In still other examples, the distal fiber section 241 can have a cladding having an outer diameter in the range of 120 to 130 micrometers.

FIGS. 3-10 show a process for manufacturing and installing the expanded beam fiber optic ferrule assembly of FIG. 1. A first step of the process is generally a cleaving step in which one end 60 of the stub optical fiber 42 is cleaved (see FIG. 3). In a second step, the beam expansion section 34 is fusion spliced to the cleaved end 60 of the stub optical fiber (see FIG. 4). In a third step, the beam expansion section 34 is precisely cleaved at an end 61 to a desired axial length (see FIG. 5). The axial length of the beam expansion section can be controlled to within plus or minus 10 micrometers or better. In a fourth step, the sacrificial section 36 is spliced to the cleaved end 61 of the beam expansion section 34 (see FIG. 6). In a fifth step, the sacrificial section 36 is cleaved to a desired length (see FIG. 7). In a sixth step, the stub optical fiber 42 is cleaved to a desired length (see FIG. 8) so as to provide a pre-manufactured optical fiber structure 32. The pre-manufactured optical fiber structure 32 includes the stub optical fiber 42 at proximal end of the pre-manufactured optical fiber structure 32, the sacrificial section 36 forming a distal tip of the pre-manufactured optical fiber structure, and the beam expansion section 34 spliced between the sacrificial section 36 and the stub optical fiber 42.

Figure 9:
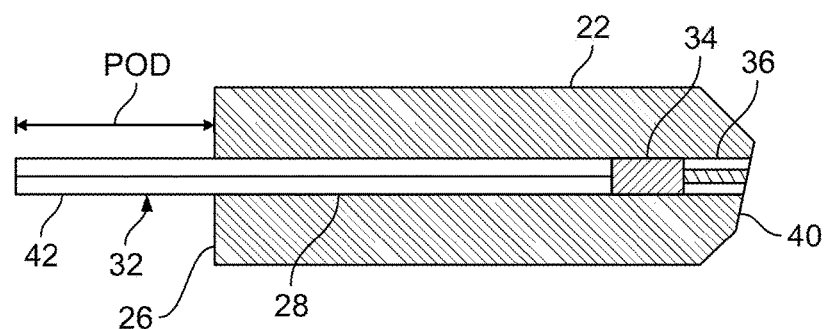
FIG. 9 depicts a seventh step of the first method for manufacturing the ferrule stub assembly of FIG. 1.
Figure 10:
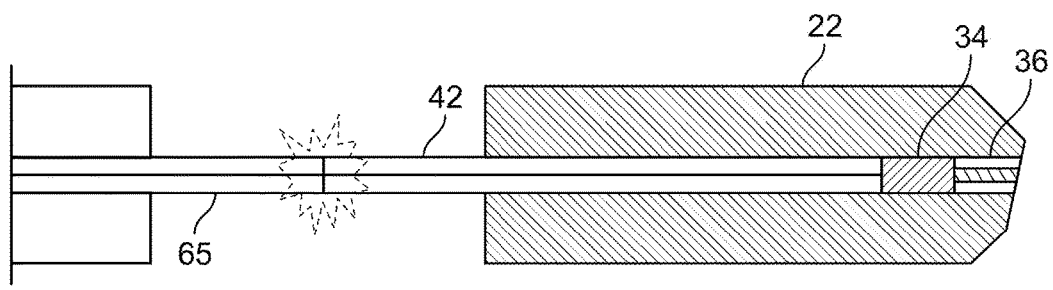
FIG. 10 depicts a final step where the expanded beam ferrule stub assembly is shown being fusion spliced to an optical fiber of a fiber optic cable.
Figure 14:
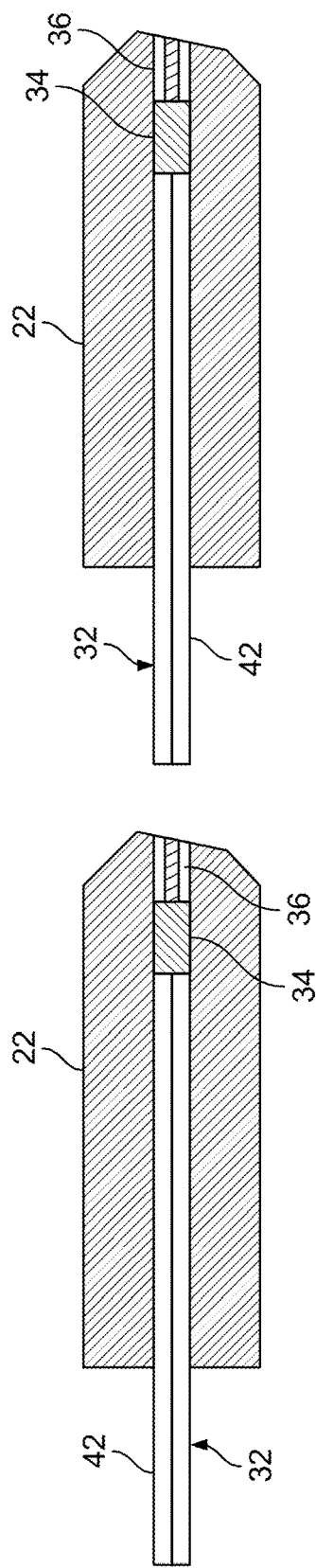
FIG. 14 depicts a fourth step of the second method for manufacturing the ferrule stub assembly of FIG. 1, wherein two of the ferrule stub assemblies are produced in this step.
Figure 15:
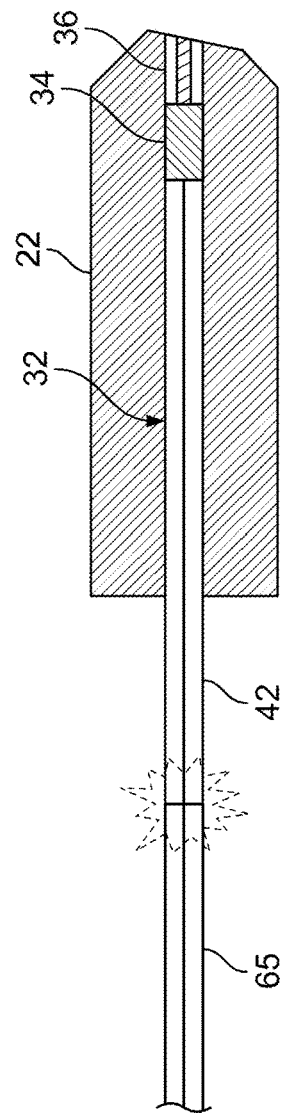
FIG. 15 depicts one of the ferrule stub assemblies produced at the step of FIG. 14 being fusion spliced to the end of an optical fiber of a fiber optic cable.
Figure 16:
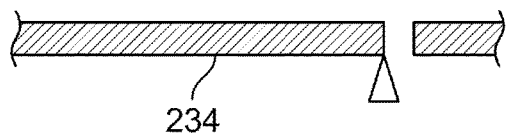
FIG. 16 depicts a first step of a third manufacturing method for manufacturing an expanded beam ferrule stub assembly of the type shown at FIG. 20.
Figure 17:
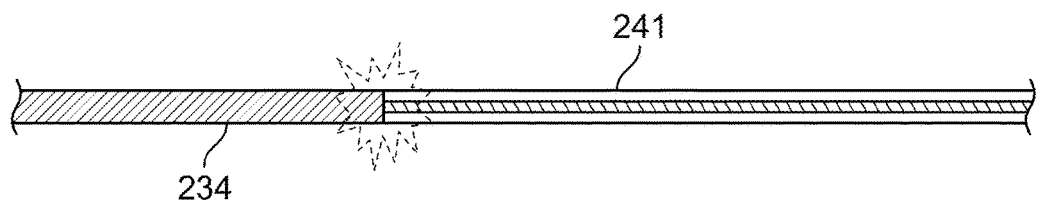
FIG. 17 depicts a second step of the third manufacturing method.
Figure 18:
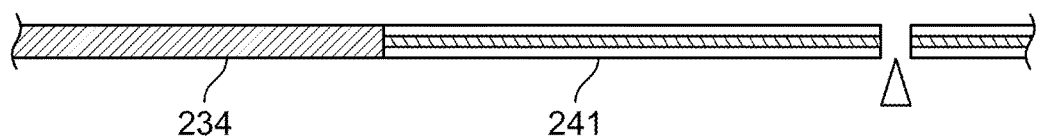
FIG. 18 depicts a third step of the third manufacturing method.
Figure 19:
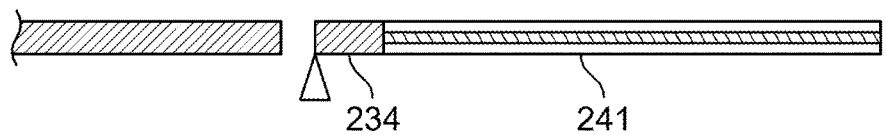
FIG. 19 depicts a fourth step of the fourth manufacturing method.
Figure 20:
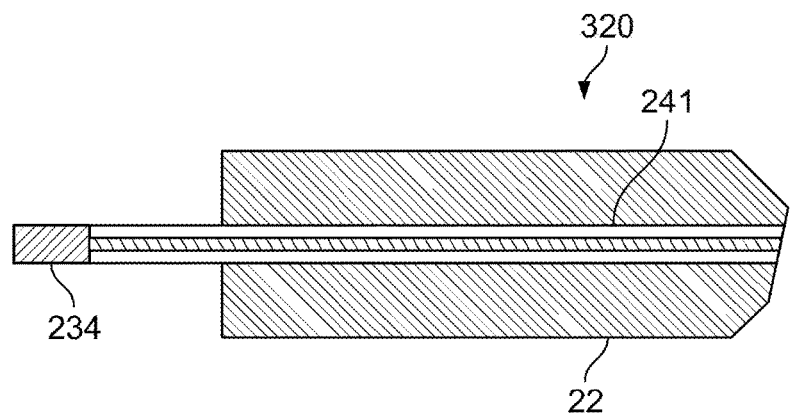
FIG. 20 shows the expanded beam ferrule stub assembly manufactured by the third manufacturing method.
Figure 21:
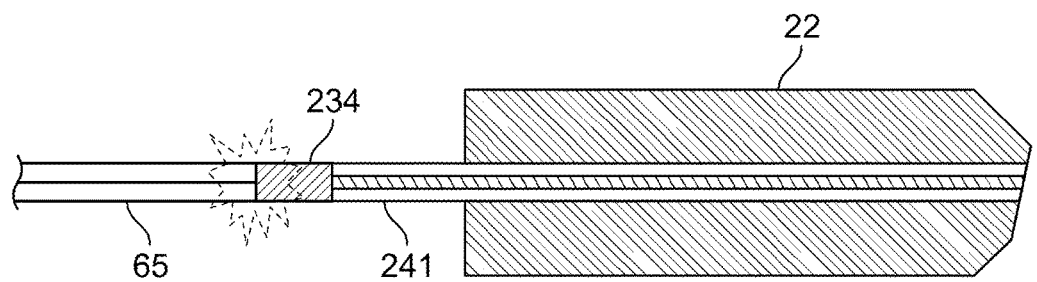
FIG. 21 shows the expanded beam ferrule stub assembly of FIG. 20 being fusion spliced to the end of an optical fiber of a fiber optic cable.

In a seventh step, the pre-manufactured optical structure 32 is loaded into the fiber passage 28 of the ferrule 22, axially fixed within the fiber passage 28 (e.g., via an adhesive such as an epoxy), and the ferrule end face 40 is polished to provide the ferrule 22 with an angled end face (or a straight polish process could be used) (see FIG. 9). A potting and curing process can be used to secure the pre-manufactured optical fiber structure 32 within the ferrule 22. During polishing, an end portion of the sacrificial section 36 can be removed (i.e., abraded away). The pre-manufactured optical fiber structure 32 can have an axial length selected so that the pre-manufactured optical fiber structure 32 projects a desired stub offset distance POD proximally beyond the proximal end 26 of the ferrule 22 when the pre-manufactured optical fiber structure 32 is secured within the ferrule. In certain examples, the POD is in the range of 20-70 millimeters. In an eighth step, the proximal end of the stub optical fiber 42 is spliced to a corresponding optical fiber 65 (e.g., a single mode optical fiber) of a cable. In certain examples, the proximal end of the stub optical fiber 42 may be re-cleaved prior to splicing to the optical fiber 65 to adjust the stub length of the stub optical fiber 42.

In certain examples, the first seven steps can be conducted at a first location (e.g., a first factory or manufacturing facility) such that the ferrule assembly 20 is made at the first location. After making the ferrule assembly 20 at the first location, the ferrule assembly 20 can be shipped to a second location for splicing to the fiber 65 of the cable. The configuration of the optical fiber structure 32 provides advantages for the splicing at the second location because the expanded beam section 34 need not be accessed or contacted at the second location. Also, by using a single mode optical fiber as the stub optical fiber 42, splicing operations can be simplified at the second location as compared to a situation where splicing directly to the expanded beam section 32 would be needed at the second location.

FIGS. 11-15 show another process for manufacturing ferrule assemblies such as the ferrule assembly 20. FIG. 11 shows a pre-cursor optical fiber structure 32a including: a) a pre-cursor sacrificial section 36a; b) beam expansion sections 34 spliced to opposite ends of the pre-cursor sacrificial section 36a; and c) stub optical fibers 42 spliced to the ends of the beam expansion sections 34. It will be appreciated that the various optical elements can be cleaved to length and stripped and cleaned as needed prior to splicing. The pre-cursor optical fiber structure 32a can be optically tested. After testing, the pre-cursor sacrificial section 36a can be cleaved at its midpoint (see FIG. 12) and the stub optical fibers 42 can be cleaved to length (see FIG. 13) such that two pre-manufactured optical fiber structures 32 are created. The pre-manufactured optical fiber structures 32 can then be secured within corresponding ferrules 22 and the ferrules can be processed (e.g., polished) to produce two of the ferrule assemblies 20 (see FIG. 14). In certain examples, the ferrule assemblies 20 can be moved to another location for splicing to optical fibers 65 of cables (see FIG. 15).

FIGS. 16-21 illustrate a process for making and installing a ferrule assembly 320 having the same design and parts as the ferrule assembly 220 except for lacking the proximal end section 235 spliced to the beam expansion section 234 and forming a proximal stub end. In contrast, the stub end of the ferrule assembly 320 is formed by the beam expansion section 234. In making the ferrule assembly 320, the beam expansion section 234 is cleaved (see FIG. 16) and the distal fiber section 241 is also cleaved and is spliced to the cleaved beam expansion section 234 (see FIG. 17). The distal fiber section 241 is then cleaved to length (see FIG. 18) and the beam expansion section 234 is cleaved to length (see FIG. 19) to form a pre-manufactured optical fiber structure including the beam expansion section 234 spliced to the distal fiber section 241. The pre-manufactured optical fiber structures can then be secured within a corresponding ferrule 22 and the ferrule can be processed (e.g., polished) to produce two of the ferrule assembly 320 (see FIG. 20). In certain examples, the ferrule assembly 320 can be moved to another location for splicing to an optical fiber 65 of a cable (see FIG. 21).

Figure 23:
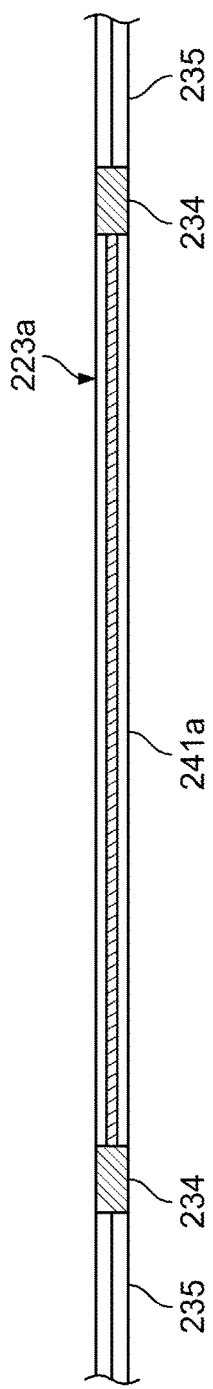
FIG. 23 depicts a first step of a fourth method for manufacturing the ferrule stub assembly of FIG. 22.
Figure 24:
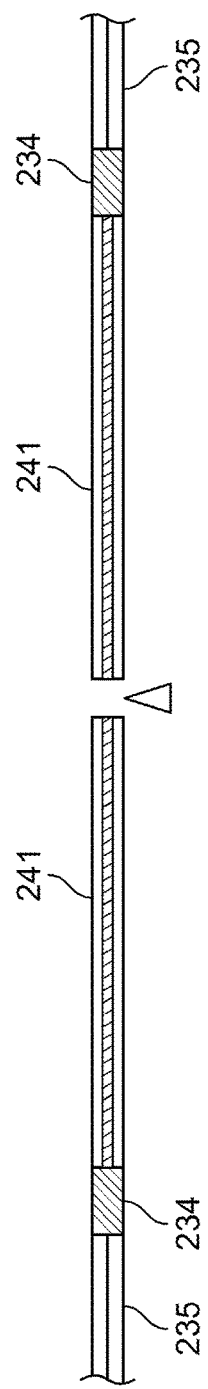
FIG. 24 depicts a second step of the fourth method for manufacturing the ferrule stub assembly of FIG. 22.
Figure 25:
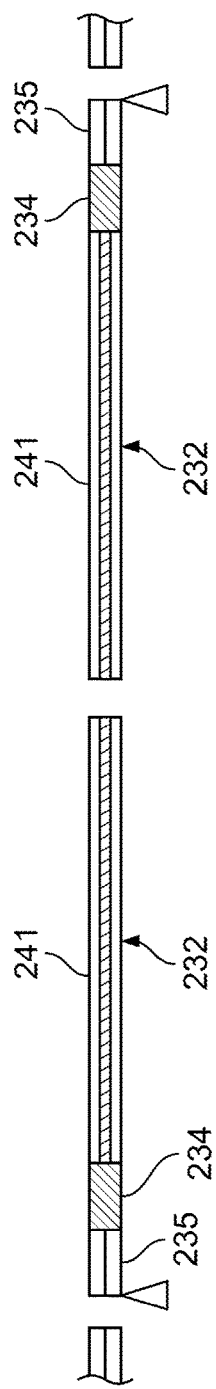
FIG. 25 depicts a third step of the fourth method for manufacturing the ferrule stub assembly of FIG. 22.

FIGS. 23-27 show another process for manufacturing ferrule assemblies such as the ferrule assembly 220. FIG. 23 shows a pre-cursor optical fiber structure 232a including: a) a pre-cursor distal fiber section 241a; b) beam expansion sections 234 spliced to opposite ends of the pre-cursor distal fiber section 241a; and c) proximal end section 235 spliced to the ends of the beam expansion sections 234. It will be appreciated that the various optical elements can be cleaved to length and stripped and cleaned as needed prior to splicing. The pre-cursor optical fiber structure 232a can be optically tested. After testing, the pre-cursor distal fiber section 241a can be cleaved at its midpoint (see FIG. 24) and the proximal end sections 235 can be cleaved to length (see FIG. 25) such that two pre-manufactured optical fiber structures 232 are created. The pre-manufactured optical fiber structures 232 can then be secured within corresponding ferrules 22 and the ferrules can be processed (e.g., polished) to produce two of the ferrule assemblies 220 (see FIG. 26). In certain examples, the ferrule assemblies 220 can be moved to another location for splicing to optical fibers 65 of cables (see FIG. 27).

Figure 34:
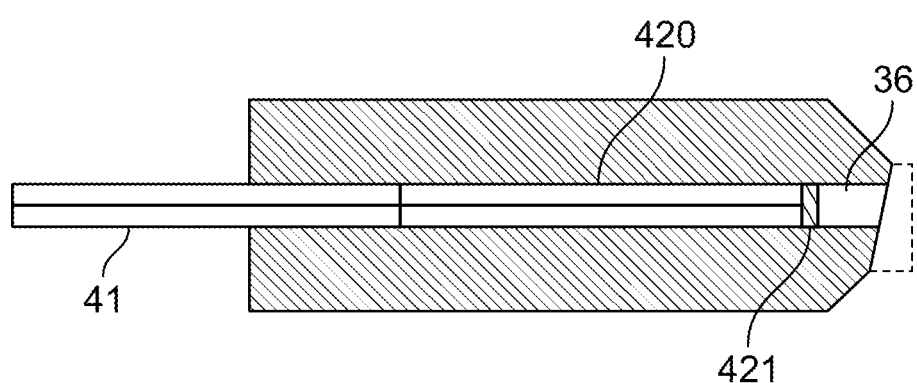
FIG. 34 shows a further fiber optic ferrule assembly in accordance with the principles of the present disclosure.

FIG. 34 shows a ferrule assembly that includes stub fiber structure including a specialty fiber 420 instead of a beam expander. The specialty fiber 420 is fusion spliced between a stub fiber 41 and a sacrificial fiber 36. The sacrificial fiber 36 is depicted as a core-less fiber. However, the sacrificial fiber 36 could be a fiber that has guiding properties, such as a single mode fiber or a multi-mode fiber. A coating layer 421 is positioned between the sacrificial fiber 36 and the specialty fiber 420. The sacrificial fiber 36 protects the coating 421 and the specialty fiber 420. The specialty fiber 420 can include an attenuating fiber. The coating layer 421 can include a wavelength selective coating that can provide wavelength filtration.

From the foregoing detailed description, it will be evident that modifications and variations can be made without departing from the spirit and scope of the disclosure. Aspects of the present disclosure are applicable to both single fiber ferules and multi-fiber ferrules. In other embodiments, aspects of the present disclosure can be used with ferrule-less connectors where the optical fiber stub is not supported within a ferrule.

What is claimed is:

1. A fiber optic component comprising:
a ferrule having a distal end and a proximal end, the ferrule defining a fiber passage extending though the ferrule along a fiber passage axis in a proximal-to-distal orientation; and
an optical fiber structure affixed within the fiber passage, the optical fiber structure including a beam expansion section and a sacrificial section that is optically coupled to the beam expansion section, the beam expansion section having a construction adapted to expand an optical beam from a first beam diameter to an enlarged second beam diameter, the sacrificial section being configured to receive the optical beam having the second beam diameter from the beam expansion section, the sacrificial section being positioned at the distal end of the ferrule, the sacrificial section having a polished end face at the distal end of the ferrule, and the sacrificial section having a core-less construction or having a core with a core diameter that is larger than the enlarged second beam diameter.

2. The fiber optic component of claim 1, wherein the beam expansion section includes a GRIN fiber.

3. The fiber optic component of claim 2, wherein the GRIN fiber is fusion spliced to the sacrificial section.

4. The fiber optic component of claim 1, wherein the sacrificial section has a length less than or equal to 500 micrometers.

5. The fiber optic component of claim 1, wherein the sacrificial section has a length less than or equal to one-half s, where $$s = \frac{2n\pi w_0^2}{\lambda} \sqrt{10^{\frac{IL(dB)}{10}} - 1}$$

and where n is an index of refraction of the sacrificial section, IL is a maximum acceptable insertion loss in dB through twice the length of the sacrificial section, $w_o$ is a beam waist of the optical beam in micrometers at the second beam diameter, and λ is a wavelength of the optical beam in micrometers.

6. The fiber optic component of claim 5, wherein the acceptable IL equals 0.5 dB.

7. The fiber optic component of claim 5, wherein the acceptable IL equal 0.2 dB.

8. The fiber optic component of claim 5, wherein the acceptable IL equals 0.1 dB.

9. The fiber optic component of claim 1, wherein the distal end of the ferrule has an angle polished face or a straight polished face.

10. The fiber optic component of claim 1, wherein the core-less construction of the sacrificial section includes a core-less glass fiber.

11. The fiber optic component of claim 1, wherein the core diameter is at least 1.25 times as large as the second beam diameter.

12. The fiber optic component of claim 1, wherein the core diameter is at least 1.5 times as large as the second beam diameter.

13. The fiber optic component of claim 1, wherein the core diameter is at least 2.0 times as large as the second beam diameter.

14. The fiber optic component of claim 1, wherein the optical fiber structure includes a stub optical fiber optically coupled to the beam expansion section such that the beam expansion section is positioned between the stub optical fiber and the sacrificial section, the stub optical fiber including a stub end portion that projects proximally from the proximal end of the ferrule.

15. The fiber optic component of claim 14, wherein the stub optical fiber includes a single mode optical fiber having a cutoff wavelength less than or equal to 1310 nanometers.

16. A fiber optic component comprising:
a ferrule having a distal end and a proximal end, the ferrule defining a fiber passage extending though the ferrule along a fiber passage axis in a proximal-to-distal orientation; and
an optical fiber structure affixed within the fiber passage, the optical fiber structure including a first section and a sacrificial section that is optically coupled to the first section, the sacrificial section being positioned at the distal end of the ferrule, the sacrificial section having a polished end face at the distal end of the ferrule.

17. A fiber optic component comprising:
a ferrule having a distal end and a proximal end, the ferrule defining a fiber passage extending though the ferrule along a fiber passage axis in a proximal-to-distal orientation; and
an optical fiber structure affixed within the fiber passage, the optical fiber structure including a beam expansion section, the optical fiber structure also including a proximal end section optically connected with the beam expansion section, the proximal end section forming a stub end of the optical fiber structure, the stub end being proximally offset from the proximal end of the ferrule by a proximal offset distance, the proximal offset distance being less than or equal to 70 millimeters, the proximal end section including a single mode optical fiber.

18. The fiber optic component of claim 17, wherein the optical fiber structure includes a step-index optical fiber affixed in the fiber passage of the ferrule, the beam expansion section being optically coupled between the single mode optical fiber and the step-index optical fiber, the step-index optical fiber having a larger core diameter as compared to the single mode optical fiber, and the beam expansion section being configured to expand an optical beam conveyed through the beam expansion section in a direction from the single mode optical fiber to the step-index optical fiber.

19. The fiber optic component of claim 18, wherein the beam expansion section is positioned proximally with respect to the proximal end of the ferrule.

20. The fiber optic component of claim 17, wherein the beam expansion section is affixed within the fiber passage of the ferrule, wherein the optical fiber structure includes a sacrificial section optically coupled to the beam expansion section, wherein the beam expansion section is positioned between the sacrificial section and the single mode optical fiber, and wherein the sacrificial section is positioned at the distal end of the ferrule and includes a polished end face.

21. The fiber optic component of claim 17, wherein the single mode optical fiber has a cutoff wavelength less than or equal to 1310 nanometers.

22. The fiber optic component of claim 18, wherein the single mode optical fiber and the step-index optical fiber have cutoff wavelengths less than or equal to 1310 nanometers.

23. The fiber optic component of claim 17, wherein the beam expansion section has an outer diameter that is at least 1.25 times as large as an outer diameter of the stub end of the optical fiber structure.

24. The fiber optic component of claim 14, wherein the beam expansion section is configured to have a major portion that expands the optical beam as the beam travels from the stub optical fiber toward the sacrificial section from the first beam diameter D1 to a third beam diameter D3 larger than the second beam diameter D2, and a minor portion that focuses the optical beam from the third beam diameter D3 to the second beam diameter D2 at the sacrificial section.

25. The fiber optic component of claim 1, wherein the beam expansion section is configured to form a minimum beam waist at a proximal end of the sacrificial section.

26. The fiber optic component of claim 1, wherein the optical fiber structure is cylindrical with an outer diameter between 120 and 130 micrometers.

27. The fiber optic component of claim 16, wherein the sacrificial section has a length less than or equal to one-half s, where $$s = \frac{2n\pi w_0^2}{\lambda}\sqrt{10^{\frac{IL(dB)}{10}}-1}$$

and where n is an index of refraction of the sacrificial section, IL is a maximum acceptable insertion loss in dB through twice the length of the sacrificial section, $w_o$ is a beam waist of the optical beam in micrometers at the second beam diameter, and $\lambda$ is a wavelength of the optical beam in micrometers.

28. The fiber optic component of claim 16, wherein the sacrificial section has a core-less construction.

29. The fiber optic component of claim 16, wherein the sacrificial section has a length less than or equal to 3 millimeters.

30. The fiber optic component of claim 16, wherein the sacrificial section has a length that is less than one half of an axial length of the ferrule after polishing.

31. The fiber optic component of claim 30, wherein the length of the sacrificial section is less than one quarter of the axial length of the ferrule after polishing.

* * * * *